United States Patent [19]

Kuwabara et al.

[11] Patent Number: 4,842,702
[45] Date of Patent: Jun. 27, 1989

[54] METHOD FOR FINISHING A WORK

[75] Inventors: Youhei Kuwabara, Fukuroi; Teruo Asaoka, Kakegawa; Yasuhiro Iwasaki, Mori, all of Japan

[73] Assignee: Shizuoka Seiki Co., Ltd., Fukuroi, Japan

[21] Appl. No.: 182,808

[22] Filed: Apr. 18, 1988

[30] Foreign Application Priority Data

Apr. 23, 1987 [JP] Japan .................................. 62-100292
May 13, 1987 [JP] Japan .................................. 62-117486
May 15, 1987 [JP] Japan .................................. 62-119943

[51] Int. Cl.$^4$ .............................................. B23H 3/10
[52] U.S. Cl. .............................. 204/129.43; 204/129.5; 204/DIG. 9; 204/238
[58] Field of Search ............ 204/129.4, 129.43, 129.5, 204/238, DIG. 9

[56] References Cited

U.S. PATENT DOCUMENTS

| 3,371,022 | 2/1968 | Inoue | 204/238 X |
| 3,527,686 | 9/1970 | Inoue | 204/224 M |
| 3,607,689 | 9/1971 | Inoue | 204/129.43 |
| 4,720,616 | 1/1988 | Inoue | 204/129.43 X |

FOREIGN PATENT DOCUMENTS 1076633  7/1967  United Kingdom ........... 204/129.43

Primary Examiner—Donald R. Valentine
Attorney, Agent, or Firm—Armstrong, Nikaido, Marmelstein, Kubovcik & Murray

[57] ABSTRACT

An electrode is positioned with a predetermined gap between the electrode and a surface of a work in an electrolyte tank. Pulses are applied to the electrode. Electrolyte including residual products is discharged from the tank. Clean electrolyte is supplied to the electrolyte tank for next machining. After predetermined time, pulses for the next machining are applied to the electrode.

3 Claims, 5 Drawing Sheets

METHOD FOR FINISHING A WORK

BACKGROUND OF THE INVENTION

The present invention relates to a method for finishing a surface of a work by electrolytic machining, and more particulary to a method for finishing the surface having a three-dimensional shape.

U.S. Pat. Nos. 3,527,686 and 3,607,689 disclose electrolytic machines. In the machine liquid electrolyte is continuously passed between an electrode and a work at a high speed during machining, so that residual products such as particles of eroded metal from the work, hydrogen gas, and others are discharged from the gap between the electrode and the work. However, in the case of the work having a complicated three-dimentional shaped recess, it is impossible to pass the liquid electrolyte through the gap having a complicated shape at a constant speed. The accuracy of the product is greatly influenced by the irregularities in the electrolyte flow. In addition, the concentration of the electrolyte at an outlet of an electrolyte tank is different from the concentration at an inlet, even if the pressure of the liquid is increased. Accordingly, it is impossible to produce accurate products.

In order to eliminate such disadvantages, the applicant proposed a system in which liquid electrolyte is not passed through an electrolyte tank and discharged together with residual products after application of pulses, and clean electrolyte is supplied to the tank for the subsequent process. However, pulses in the subsequent process are applied while the electrolyte moves in the gap between the work and the electrode. In such a state, flow rate of the electrolyte in the gap is different in localities, so that the electrolyte swirls in the gap. As a result, machining condition is different in localities, so that patterns dependent on the irregular flow of the electrolyte are formed on the surface of the work, which results in deterioration of surface quality of the work.

SUMMARY OF THE INVENTION

The object of the present invention is to provide an electrolytic finishing method which may finish a three-dimensional surface of a work to a product having a lustrous surface with accuracy at high speed.

According to the present invention, there is provided a method for finishing a work comprising positioning an electrode to form a predetermined gap between the electrode and the surface of the work, supplying electrolyte to an electrolyte tank so as to submerge the electrode and the work, applying pulses to the electrode, discharging the electrolyte including residual products after one cycle of machining, re-supplying clean electrolyte to the electrolyte tank, and applying pulses to the electrode after a predetermined period of time for the next cycle of the machining.

In an aspect of the invention, the machining is divided into a first process and a second process, and a pulse in the second process is set to a higher current density than the first process, and a removing pulse having a higher current density than the pulse in the first process is intermittently applied during the first process.

The other objects and features of this invention will be apparently understood from the following description with reference to the accompanying drawings.

DETAILED DESCRIPTION OF THE PREFERRED EMBODIMENT

Figure 1:
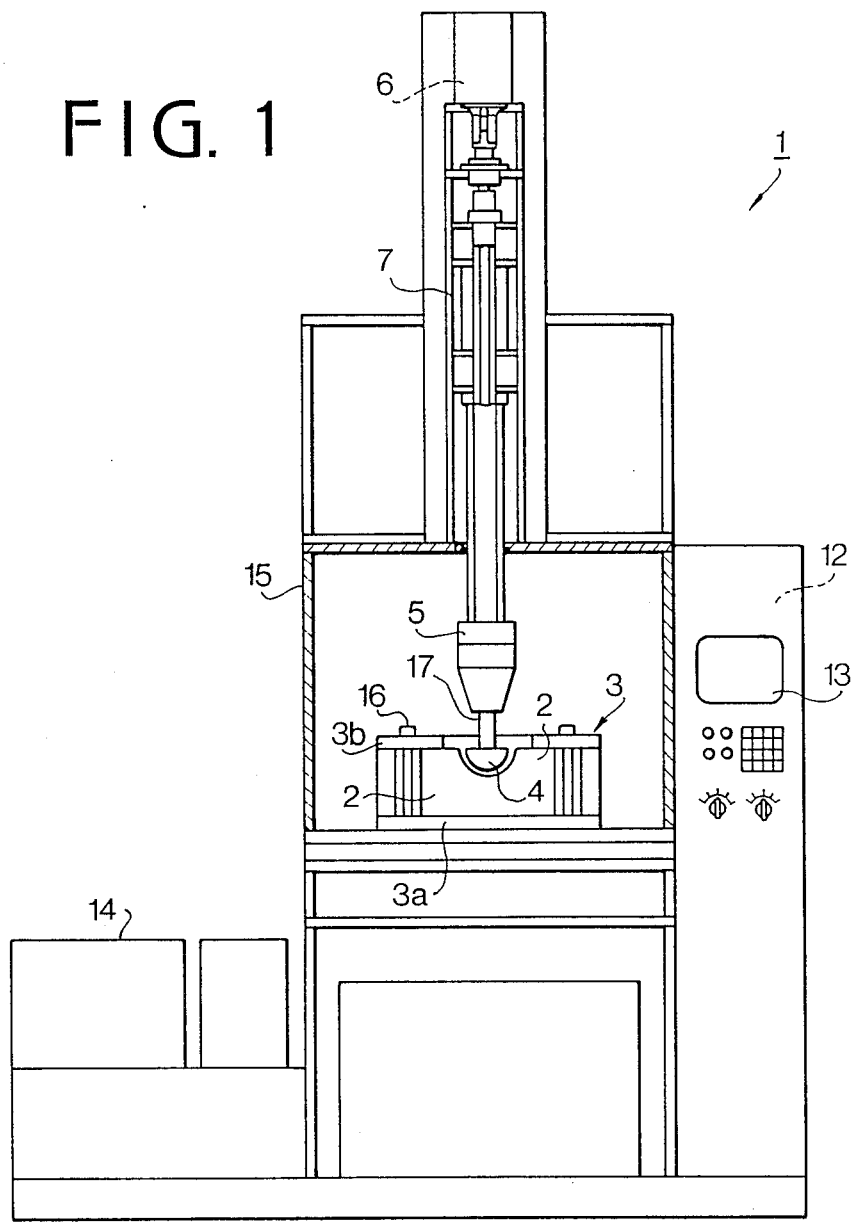
FIG. 1 is a front view of an electrolytic finishing machine according to the present invention.
Figure 2:
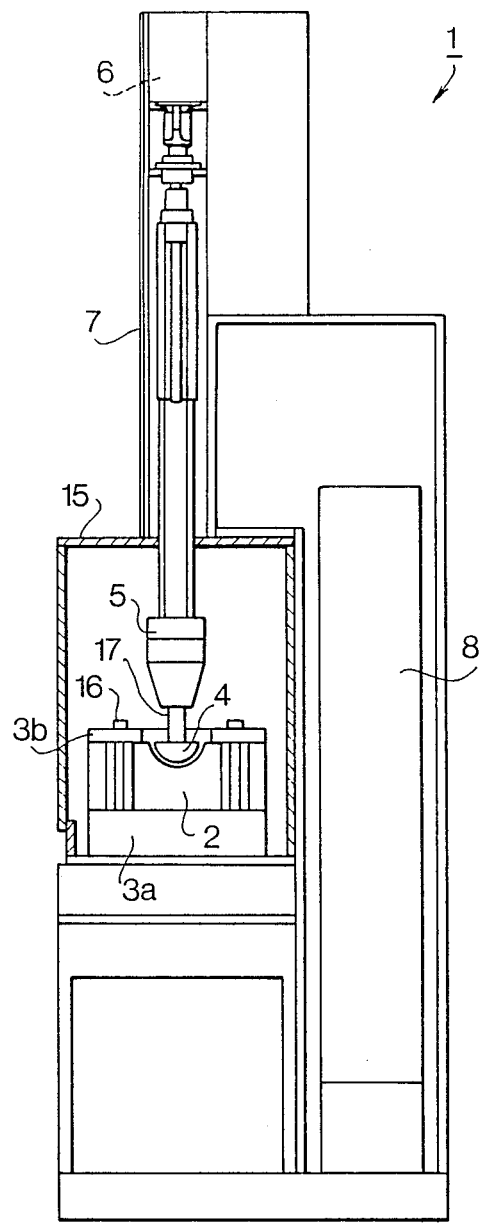
FIG. 2 is a side view of the machine.
Figure 3:
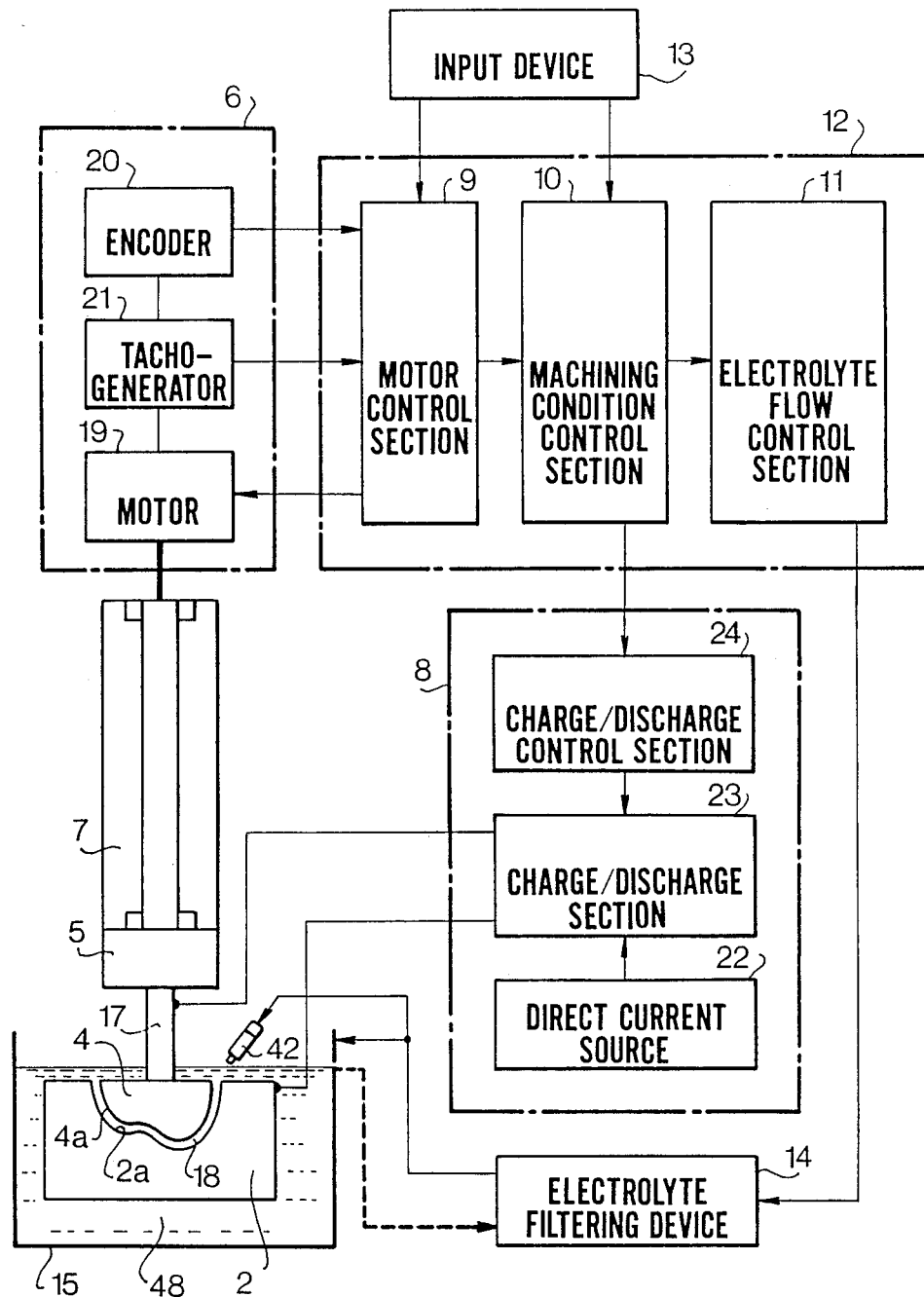
FIG. 3 is a block diagram showing a system of the present invention.

Referring to FIGS. 1 to 3, the electrolytic finishing machine 1 has a work fixing device 3 in an electrolyte tank 15. A work 2 is mounted on a base 3a of the device 3 and fixed thereto by an upper plate 3b and bolts 16 screwed in the base 3a. An electrode 4 made of copper is secured to the lower end of a rod 17 of an electrode holding device 5. The holding device 5 is operatively connected to an electrode driving device 6 through an electrode driving direction converter 7. The converter 7 is arranged to change rotary output of a motor 19 in device 6 into axial movement of the rod 17.

The work 2 has a three-dimensional recess 2a to be finished, which has been formed by an electrical discharge machine (not shown) with the electrode 4.

As shown in FIG. 3, the driving device 6 has a rotary encoder 20, tacho-generator 21 and motor 19. Output signals of the encoder 20 and tacho-generator 21 are supplied to a motor control section 9 of a control unit 12, and motor 19 is operated by a control signal from the motor control section 9. The control unit 12 has a machining condition control section 10 and an electrolyte flow control section 11.

The system has a power source device 8 which comprises a direct current source 22, a charge/discharge section 23, and a charge/discharge control section 24 for controlling the charge/discharge section 23. The charge/discharge section 23 generates a pulse of a current density (specifically means "average current density") for a pulse duration dependent on the surface area of the recess 2a, in response to signals from the machining condition control section 10.

The system further has an input device 13 for inputting machining conditions, and an electrolyte filtering device 14.

The input device 13 is arranged to input various machining condition signals such as material of the work, surface area of the work, machining depth, grades of dimension accuracy, surface roughness, and dimension of the gap 18 between the electrode and the work. The signals are fed to the motor control section 9 and the machining condition control section 10.

The electrolyte filtering device 14 has a dirty tank for receiving electrolyte including residual products, which is removed from the electrolyte tank 15, a centrifugal separator for separating the electrolyte and a pump for ejecting the clean electrolyte from a nozzle 42.

Figure 4A:
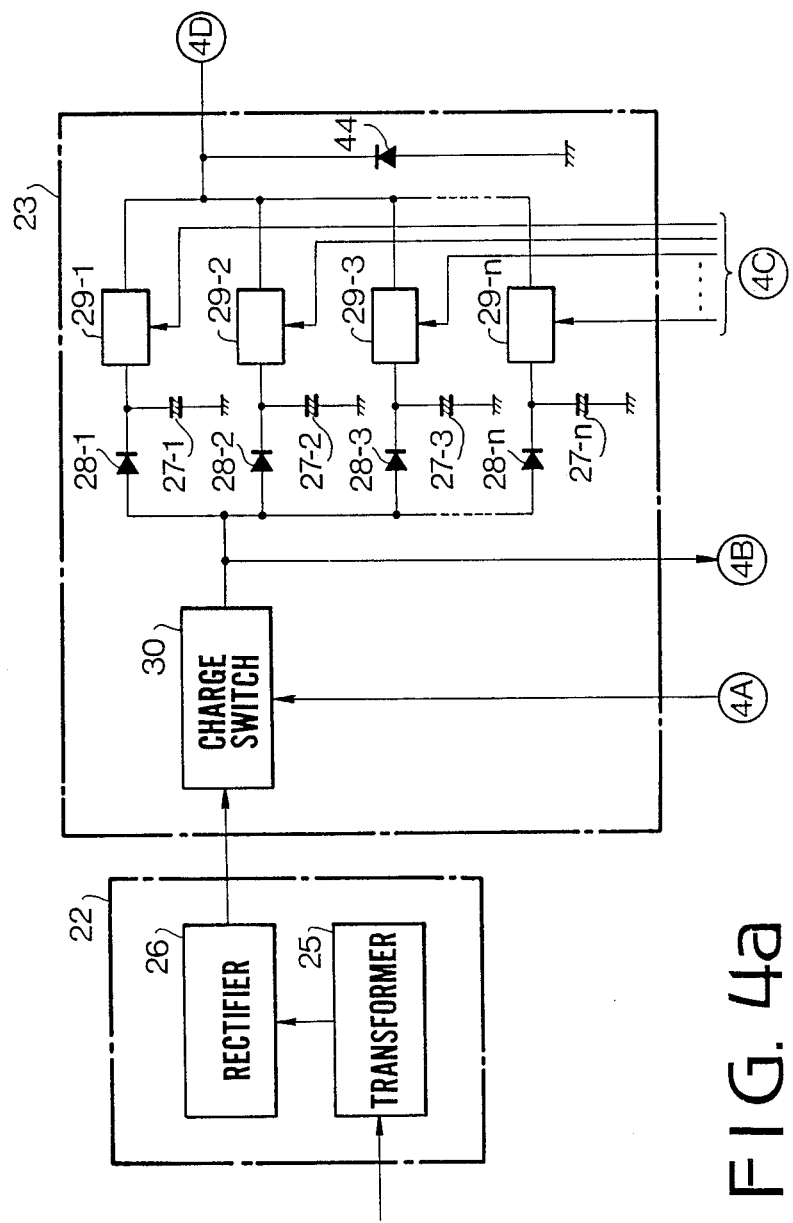
FIGS. 4a and 4b show a block diagram showing a system for supplying current to an electrode.
Figure 4B:
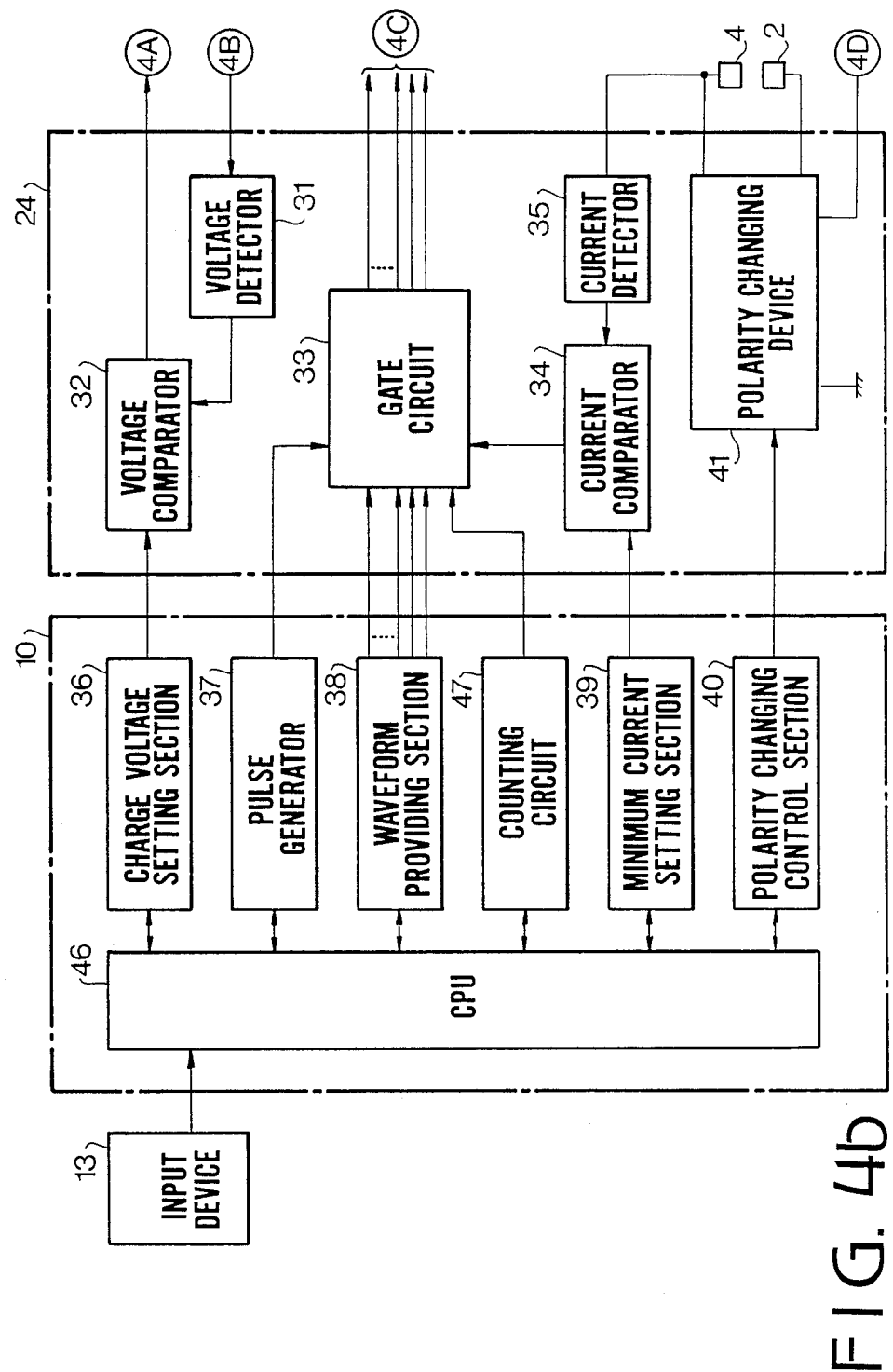

Referring to FIGS. 4a and 4b, the machining condition control section 10 comprises CPU 46 applied with signals from the input device to calculate machining and others, a waveform providing section 38 for providing current waveform discharged in a gap 18 between the work 2 and the electrode 4, a pulse generator 37 for generating pulses each having a predetermined pulse duration, and a charge voltage setting section 36. The control section further has a minimum current setting section 39 and a polarity changing control section 40, and a counting circuit 47. The direct current source 22 comprises a transformer 25 and a rectifier 26. The charge/discharge section 23 has a plurality of capacitors 27-1 to 27-n which are parallely connected with each other, diodes 28-1 to 28-n for preventing reverse current to the current source, switches 29-1 to 29-n for generating pulses, and a charge switch 30 responsive to a signal from a voltage comparator 32 for connecting the direct current source 22 to capacitors 27-1 to 27-n to charge each capacitor to a set value. The charge/discharge control section 24 comprises a voltage detector 31 for detecting charge voltage applied to the capacitors 27-1 to 27-n, voltage comparator 32 for comparing a set voltage set at charge voltage setting section 36 in the machining condition control section 10 with the charge voltage detected by the voltage detector 31.

The control section 24 further comprises a current detector 35 for detecting current of the electric charge discharged between the work 2 and the electrode 4, a current comparator 34 for comparing the current detected by the detector 35 with a predetermined minimum set current supplied from minimum current setting section 39 in the control section 10, and a gate circuit 33 supplied with signals from pulse generator 37, from waveform providing section 38, and from current comparator 34. When the detected current is higher than the minimum set current, the gate circuit 33 produces signals which are applied to switches 29 to discharge the capacitors 27. A polarity changing device 41 is provided to change the polarity of the current. There is provided a diode 44 for preventing the switches 29-1 to 29-n from breaking down by reverse current.

The machining method of the work is described hereinafter.

The rough machining of the work 2 is performed by the electrical discharge machining with the electrode 4. During the machining, the copper electrode is submerged in a machining fluid of kerosine having a high temperature, so that graphite layer is formed on a surface 4a of the electrode 4. Accordingly, before the finish machining, the graphite layer is removed in the following method.

The electrode 4 used in the electrical discharge machining is attached to the rod 17. The position of the work 2 is adjusted by operating X and Y tables (not shown) to align the recess 2a with electrode surface 4a. The electrode 4 is lowered by the driving device 6 to contact the work 2. Thereafter the electrode is raised to provide a predetermined gap. After electrolyte 48 (FIG. 3) is supplied to the tank 15, the polarity changing control section 40 actuates the polarity changing device 41 to set the electrode 4 positive and to set the work 2 negative. Pulses are applied to the electrode 4 to remove the graphite layer. Thereafter, the polarity is reversed, and the electrode 4 is raised.

Clean electrolyte is ejected from the nozzle 42 to discharge the electrolyte in the gap 18, while the electrolyte in the tank 15 is discharged together with the graphite. The finishing machining is performed as described hereinafter.

The electrode 4 is lowered again to be contacted with the work, and the position of the electrode is stored as an original position A. Then, the electrode is raised to form a predetermined initial gap, and electrolyte is supplied to the tank 15.

The finishing machining comprises a first process and a second process. In the first process, a pulse having a current density (for example 17A/cm$^2$) and a pulse duration shorter than 10 milli second (msec) is applied to the electrode 4 by the pulse generator 8. By the electrolytic process, projected portions on the surface of the recess 2a are eroded, so that the height of each projection may be reduced. After one or more pulses are applied, the electrode 4 is raised to expand the gap 18. The electrolyte is ejected from the nozzle 42 to the gap 18 to remove residual products, while the electrolyte in the tank 15 is discharged together with the residual products.

After the discharge of the electrolyte, the electrode 4 is lowered to contact the recess 2a and the position of the electrode 4 is stored. The stored position is compared with the original position A, so that the machining depth per one machining cycle (at every one or more pulses) is measured. Thereafter, the electrode 4 is raised again to form the predetermined gap and clean electrolyte is supplied to the tank 15.

In accordance with the present invention, at the time when the electrode 4 is raised to the set position, CPU 46 supplies a signal to the counter 47. The counter 47 produces a pulse generating signal after a predetermined period of time during which the electrolyte becomes stationary.

In response to the pulse generating signal, pulses are applied to the electrode. Thus, the above described machining cycle is repeated in accordance with signals from the control unit 12. When the machining cycle is repeated a predetermined times, the CPU 46 applies a signal to the waveform providing section 38 which in turn supplies a signal to the pulse generator 8. The pulse generator 8 generates one or more pulses, before the electrode is raised. The pulse has a longer pulse duration than the previous pulse, for example 15 msec, and has a higher current density than the previous pulse. By the longer pulse, a layer formed on the electrode work, which includes electrolytic products is removed. After that, the electrode is raised and clean electrolyte is ejected from the nozzle 42 to discharge the component of the layer.

The above described cycle including the application of longer pulses between the machining cycle is repeated predetermined times.

When the difference between the sum of machining depth and the input depth becomes a predetermined value with respect to the input depth, (for example 1 μm), the second process is performed. In the second process, a pulse having a high current density which is as half as high again (1.5 times) as the current density of the pulse in the first process, or more than 1.5 times, and has a longer pulse duration (between 15 msec and 60 msec) is applied.

In the second process, the same machining as the first process is repeatedly performed by the pulses.

EXAMPLE

Electrode: Copper
Stock: Tool steel (surface roughness of 20 μm)
Electrolyte: Sodium nitrate (concentration of 40%)

First Process

Machining pulse duration: 5 msec
Current density: 17 A/cm$^2$
Removing pulse duration: 15 msec
Current density: 40 A/cm$^2$ Second Process Pulse duration: 15 msec
Current density: 40 A/cm$^2$
Finished surface roughness: Less than 1 μm
Finished surface: Lustrous surface The present invention can be used for finishing works other than the metal work, such as silicon single crystal for manufacturing semiconductors, gallium aersenide stock, and others.

From the foregoing it will be understood that the electrolytic finishing is performed in stationary state of electrolyte. Accordingly, the machining is done under uniform concentration of electrolyte and constant condition during the electrolytic finishing, so that accurate products having high quality can be obtained.

While the presently preferred embodiment of the present invention has been shown and described, it is to be understood that this disclosure is for the purpose of illustration and that various changes and modification may be made without departing from the spirit and scope of the invention as set forth in the appended claims.

What is claimed is:

1. A method for finishing a work comprising:
   positioning an electrode to form a predetermined gap between the electrode and the surface of the work;
   supplying electrolyte to an electrolyte tank so as to submerge the electrode and the work;
   applying working pulses to the electrode;
   supplying clean electrolyte to the gap and discharging the electrolyte including residual products after one cycle of machining;
   re-supplying clean electrolyte to the electrolyte tank;
   applying working pulses to the electrode after a predetermined period of time, said predetermined period of time being a time in which a swirl of the electrolyte in the tank is reduced, said swirl generated by re-supplying the clean electrolyte; and
   applying a removing pulse having a higher current density than the working pulse.

2. The method according to claim 1 wherein the machining is divided into a first process and a second process, and a pulse in the second process is set to a higher current density than the first process.

3. The method according to claim 1 further comprising applying pulses having a reverse polarity to the pulse for the machining, before the machining, whereby a layer formed on the electrode is removed.

* * * * *